(12) United States Patent
Strange et al.

(10) Patent No.: US 7,660,966 B2
(45) Date of Patent: *Feb. 9, 2010

(54) LOCATION-INDEPENDENT RAID GROUP VIRTUAL BLOCK MANAGEMENT

(75) Inventors: Stephen H. Strange, Mountain View, CA (US); Scott Schoenthal, San Ramon, CA (US); Douglas P. Doucette, Freeland, WA (US); Srinivasan Viswanathan, Fremont, CA (US)

(73) Assignee: NetApp, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/497,590

(22) Filed: Aug. 2, 2006

(65) Prior Publication Data

US 2006/0271734 A1    Nov. 30, 2006

Related U.S. Application Data

(63) Continuation of application No. 10/394,890, filed on Mar. 21, 2003, now Pat. No. 7,111,147.

(51) Int. Cl.
*G06F 11/07* (2006.01)
*G06F 12/08* (2006.01)
*G06F 12/16* (2006.01)

(52) U.S. Cl. ............... 711/209; 711/114; 711/206; 714/6

(58) Field of Classification Search ............... None
See application file for complete search history.

(56) References Cited

U.S. PATENT DOCUMENTS 3,876,978 A    4/1975    Bossen et al.
4,092,732 A    5/1978    Ouchi
4,201,976 A    5/1980    Patel
4,205,324 A    5/1980    Patel
4,375,100 A    2/1983    Tsuji et al.
4,467,421 A    8/1984    White
4,517,663 A    5/1985    Imazeki et al.
4,667,326 A    5/1987    Young et al.
4,688,221 A    8/1987    Nakamura et al.
4,722,085 A    1/1988    Flora et al.
4,755,978 A    7/1988    Takizawa et al.
4,761,785 A    8/1988    Clark et al.
4,775,978 A    10/1988   Hartness
4,796,260 A    1/1989    Schilling et al.
4,817,035 A    3/1989    Timsit
4,825,403 A    4/1989    Gershenson et al.

(Continued)

OTHER PUBLICATIONS

David Hitz et al. TR3002 File System Design for a NFS File Server Appliance published by Network Appliance, Inc.

(Continued)

*Primary Examiner*—Gary J Portka
(74) *Attorney, Agent, or Firm*—Cesari and McKenna, LLP

(57) ABSTRACT

A storage operating system is configured to assign volume block numbers (VBNs) to a volume. The system has a plurality of disks, and each disk of the plurality of disks is assigned disk block numbers (DBNs). A raidmap is configured to map the VBNs to the DBNs of the plurality of physical disks, the mapping for a particular disk stored in a disk label for the particular disk. The disk label for the particular disk is then written to the particular disk.

82 Claims, 7 Drawing Sheets

U.S. PATENT DOCUMENTS

| | | | |
|---|---|---|---|
| 4,837,680 | A | 6/1989 | Crockett et al. |
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schilling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A | 11/1996 | Blaum et al. |
| 5,623,595 | A | 4/1997 | Bailey |
| 5,696,934 | A | 12/1997 | Jacobson et al. |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,963,962 | A | 10/1999 | Hitz et al. |
| 6,038,570 | A | 3/2000 | Hitz et al. |
| 6,092,215 | A | 7/2000 | Hodges et al. |
| 6,138,201 | A | 10/2000 | Rebalski |
| 6,158,017 | A | 12/2000 | Han et al. |
| 6,223,300 | B1 | 4/2001 | Gotoh |
| 6,532,548 | B1 | 3/2003 | Hughes |
| 6,581,185 | B1 | 6/2003 | Hughes |
| 6,675,176 | B1 | 1/2004 | Shinkai et al. |
| 6,718,436 | B2 | 4/2004 | Kim et al. |
| 6,839,827 | B1 | 1/2005 | Beardsley et al. |
| 6,901,478 | B2 | 5/2005 | Bak et al. |

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Anvin, Peter H, "*The Mathematics of RAID 6*," Dec. 2004.

Auspex 4Front NS2000, System Architecture, Network-Attached Storage For a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the 14th VLDB Conference, LA, CA (1988).

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al, Maximizing Performance in a Striped Disk Array, Proc. 1990 ACM SIGARCH 17th Intern. Symp. on Comp. Arch., Seattle, WA, May 1990, pp. 322-331.

Chen, Peter M., et al., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., "*A Comparison of High-Availability Media Recovery techniques*," in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1998.).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., *High Performance RAIT* , Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, *IEEE Transactions on Software Engineering*, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991 , pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture," catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the $14^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

TEKROM—"About RAID 6".

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

LOCATION-INDEPENDENT RAID GROUP VIRTUAL BLOCK MANAGEMENT

RELATED APPLICATIONS

This application is a continuation of U.S. Ser. No. 10/394,890 filed on Mar. 21, 2003, entitled LOCATION-INDEPENDENT RAID GROUP VIRTUAL BLOCK MANAGEMENT, by Strange et al., now issued as U.S. Pat. No. 7,111,147 on Sep. 19, 2006.

FIELD OF THE INVENTION

The present invention relates to storage systems and, more specifically, to a technique for mapping the capacity of storage devices into any RAID group of a storage system.

BACKGROUND OF THE INVENTION

A storage system typically comprises one or more storage devices into which data may be entered, and from which data may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in the context is synonymous with hard disk drive (HDD) or direct access storage device (DASD).

Storage of information on the disk array is preferably implemented as one or more storage "volumes", defining an overall logical arrangement of disk space. The disks within a volume are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information may thereafter be retrieved to enable recovery of data lost when a storage device fails.

In the operation of a disk array, it is anticipated that a disk can fail. A goal of a high performance system is to make the mean time to data loss as long as possible, preferably much longer than the expected service life of the system. Data can be lost when one or more disks fail, making it impossible to recover data from the device. Typical schemes to avoid loss of data include mirroring, backup and parity protection. Mirroring stores the same data on two or more disks so that if one disk fails, the "mirror" disk(s) can be used to serve (e.g., read) data. Backup periodically copies data on one disk to another disk. Parity schemes are common because they provide a redundant encoding of the data that allows for loss of one or more disks without the loss of data, while requiring a minimal number of disk drives in the storage system.

Parity protection is used in a computer system to protect against loss of data on a storage device, such as a disk. A parity value may be computed by summing (usually modulo 2) data of a particular word size (usually 1 bit) across a number of similar disks holding different data and then storing the results on the disk(s). That is, parity may be computed on 1-bit wide vectors, composed of bits in predetermined positions on each of the disks. Addition and subtraction on 1-bit vectors are an equivalent to exclusive-OR (XOR) logical operations; these addition and subtraction operations can thus be replaced by XOR operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the results from the stored parity.

Typically, the disks are divided into parity groups, each of which comprises one or more data disks and a parity disk. The disk space is divided into stripes, with each stripe containing one block from each disk. The blocks of a stripe are usually at equivalent locations on each disk in the parity group. Within a stripe, all but one block contain data ("data blocks") with the one block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a file system to logically organize the information stored on the disks of a volume as a hierarchical structure of directories, files and blocks. The storage operating system may also include a RAID subsystem that manages the storage and retrieval of the information to and from the disks in accordance with input/output (I/O) operations. There is typically a one-to-one mapping between the information stored on the disks in, e.g., a disk block number (DBN) space, and the information organized by the file system in, e.g., volume block number (VBN) space. The file system consists of a contiguous range of VBNs from zero to N, for a file system of size N–1 blocks. The storage operating system may further include administrative interfaces, such as a user interface, that enable operators (system administrators) to access the system in order to implement, e.g., configuration management decisions.

Configuration management in the RAID subsystem generally involves a defined set of modifications to the topology or attributes associated with a storage array, such as a disk, a RAID group (parity group), a volume or set of volumes. Examples of these modifications includes, but are not limited to, disk addition, disk failure handling, volume splitting, volume online/offline and changes to a RAID group size. The RAID group size is the maximum number of disks that may be contained within a RAID group. For example, if a RAID group size is "3", then the number of disks in the group can be less than or equal to 3, but not more than 3. The RAID group size is typically a property of a volume, such that all RAID groups of the volume typically have the same RAID group size. When the RAID group reaches the maximum number, a new RAID group is created upon the addition of new disks.

Volume capacity is typically linked to the linear growth of the RAID groups that, in turn, are organized linearly within the VBN space of a volume. Linear growth and organization of volume capacity is generally due to prior RAID subsystem support for only one contiguous VBN-to-DBN mapping range across all disks of a RAID group. Thus if the maximum RAID group size is increased, it is generally not possible to insert disks into the middle of the linear list of RAID groups. Moreover, a prior approach supports only one contiguous DBN-to-VBN mapping range on each disk of the RAID group, typically because the entire DBN space on the disk is mapped into the VBN space of the volume. If a disk in an existing RAID group (other than the "last" RAID group) is exchanged for a larger disk, it is generally not possible to make use of the additional space on the larger disk. For example, if a disk of a RAID group failed and was replaced with a larger disk, the additional space on the larger disk could not be used. The larger replacement disk could only use the VBN range that was previously allocated to the failed disk.

These restrictions also make it difficult to dynamically expand the storage space of an existing file system when upgrading from smaller disks of a volume to larger disks and then utilizing the additional capacity for the volume. An example of a prior approach used to upgrade smaller disks of a storage system to larger disks involves creating a new volume with the larger disks and copying the data from the smaller disks to the larger disks in accordance with, e.g., a volume copy operation. Thereafter, the data stored on the smaller disks are deleted and those disks are removed from the storage system. This approach represents a time consuming procedure that involves a period of time during which the data is not accessible by a client.

Often it is desirable to migrate smaller disks of a volume to larger disks in accordance with a synchronous capacity upgrade for a storage system that supports synchronous RAID mirroring. However, a prior approach used to perform such a synchronous capacity upgrade results in system downtime or client reconfiguration. For example, assume that it is desired to "mirror" an existing volume with disks of capacity size X to a new volume with disks of capacity 2X. A prior approach involves creation of an entirely new volume and copying of the data from the old volume to the new volume in accordance with the volume copy operation.

Since a new volume is created, that volume has a name that is different from the original volume. Moreover, the original volume is brought offline for a discrete period of time in order to ensure consistency of information that is written to the new volume during the copy operation. As a result, the file system is aware of the configuration change, as not only is the file service temporarily disrupted but a renaming operation occurs that renames the newly created volume to that of the original volume. In addition, the file system identifier must be changed and other "house keeping" duties must be performed to ensure that the operators/clients are not aware that their data has moved.

SUMMARY OF THE INVENTION

The present invention overcomes the disadvantages of the prior art by providing a technique for mapping the capacity of storage devices, such as disks, into any RAID group of a volume of a storage system regardless of the location of the RAID group within a volume block number (VBN) space of the volume. To that end, the inventive technique separates disks and mapped VBN ranges, allowing for flexibility in the description and extension of RAID group capacities, while providing disk addition policies that support location-independent disk insertion into RAID groups. The inventive technique also provides a disk label structure that supports the provision of multiple VBN ranges within a RAID group and within individual disks. Moreover, the technique provides file system support for allocation and topology management of the multiple mapped VBN ranges within disks and RAID groups, as well as noncontiguous VBN ranges across the RAID groups in the volume.

According to an aspect of the inventive technique, "raidmap" data structures are used to map VBN ranges into a disk block number (DBN) space of each disk. The raidmap is maintained by a RAID subsystem of the storage system and stored in the disk label structure, i.e., a RAID label, on the disk. Another aspect of the technique relates to the mapping of multiple VBN ranges to the DBN space of a disk through the ability to store more than one raidmap in a RAID label on each disk. Each raidmap comprises mapping parameters, such as a base offset into a VBN range of a volume, a base offset into a DBN range of the disk and a size of the DBN-to-VBN mapping, used to describe the topology of the volume. These mapping parameters enable separation of DBN ranges on a disk from mapped VBN ranges of the volume. A write allocator of the file system uses the raidmap and its description of that topology to issue I/O operations when accessing data stored in the VBN range of a volume. Notably, the write allocator uses the mapping parameters of the raidmap to determine the noncontiguous VBN-to-DBN mapping of a disk within a RAID group. A topology mechanism exports the raidmap information from the RAID subsystem to the write allocator.

Advantageously, the present invention isolates disks from VBN ranges, providing flexibility in RAID group topologies. Isolation of VBN ranges from disks further allows for dynamic extension of the VBN range at the RAID level without requiring reorganization of the existing blocks in the file system. The inventive technique supports dynamic extension of capacity using existing, but formerly unused, disk space. Moreover, the on-disk label structure contains placeholders for multiple per-disk VBN range data, thereby facilitating instantiation of the raidmap information when a volume is brought into the system during initialization.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
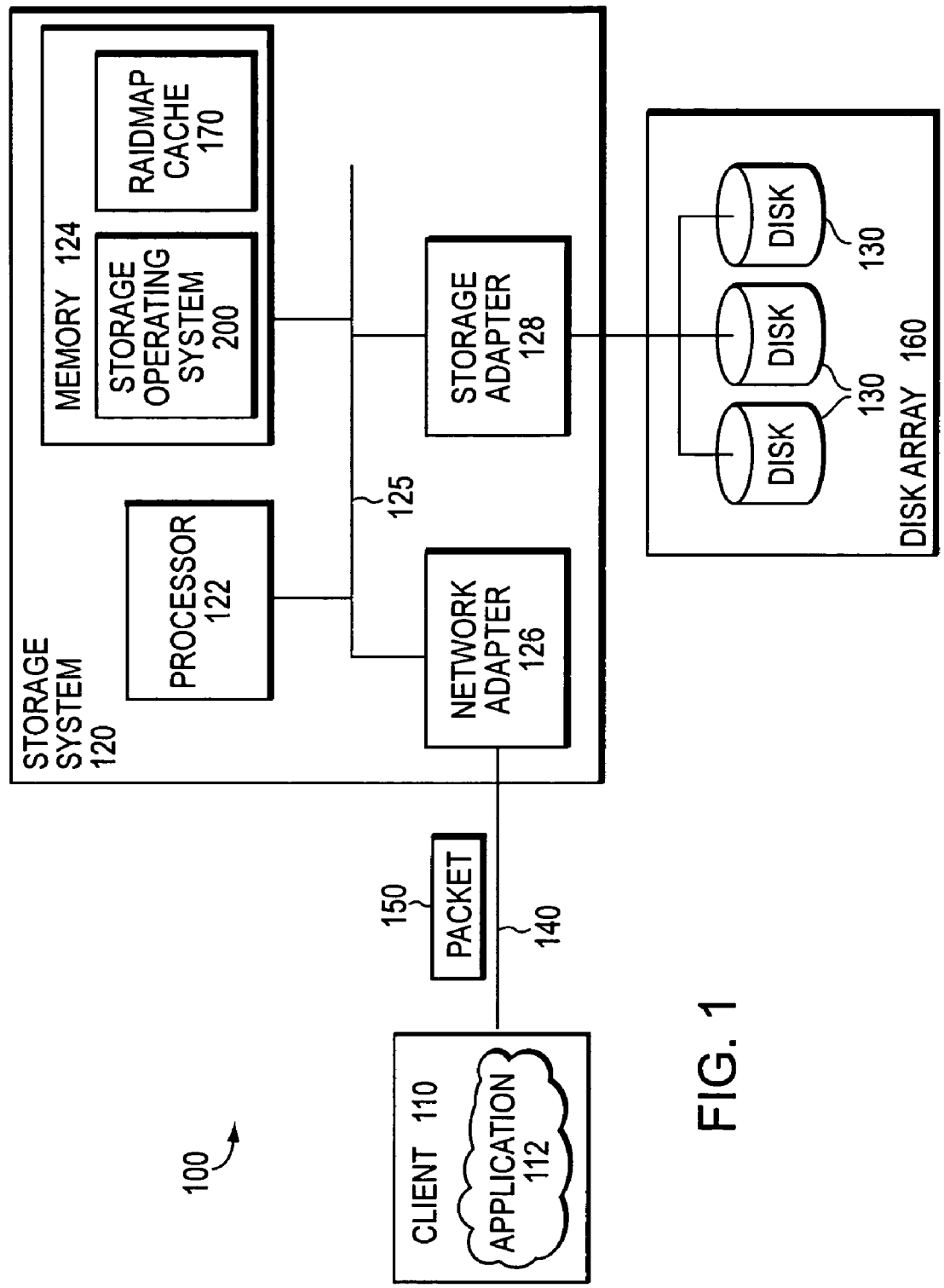
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a file system to logically organize the information as a hierarchical structure of directories, files and virtual disks (hereinafter "blocks") on the disks.

In the illustrative embodiment, the memory 124 comprises storage locations that are addressable by the processor and adapters for storing software program code and data structures associated with the present invention. For example, a portion of the memory may be organized as a "raidmap" cache 170 having locations used to store mapping data structures in accordance with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (VBN) space on the volume(s). Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. Although a RAID-4 level implementation is illustratively described herein, it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system including, for example, a write in-place file system may be enhanced for use in accordance with the inventive principles described herein. As such, where the term "WAFL" is employed, it should be taken broadly to refer to any storage operating system that is otherwise adaptable to the teachings of this invention.

Figure 2:
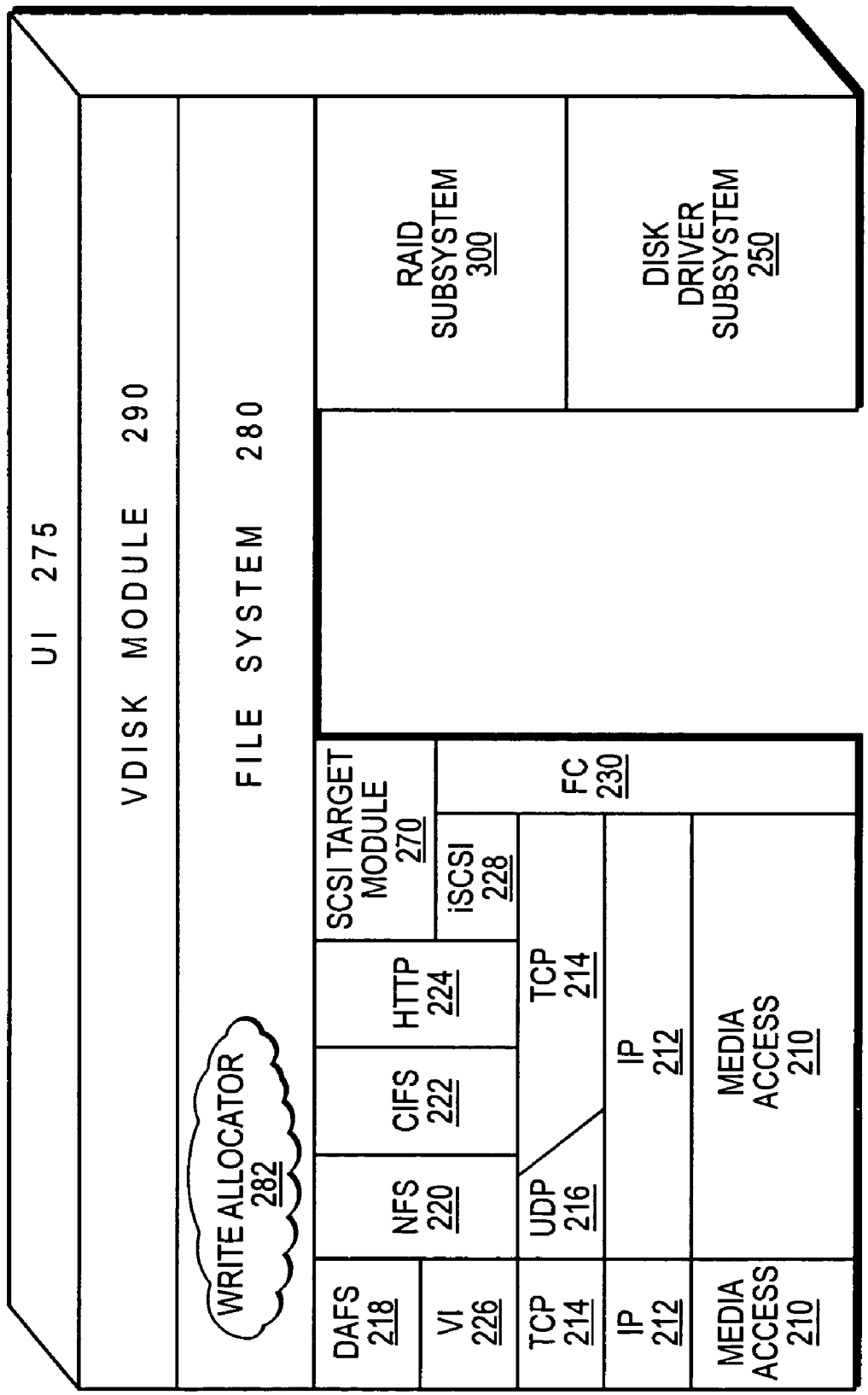
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage device manager embodied as a RAID subsystem 300 that manages the storage and retrieval of information to and from the volumes/disks in accordance with I/O operations, and a disk driver subsystem 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to various layers and subsystems, such as the RAID subsystem 300.

The file system is illustratively a message-based system that provides volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the file system layer 280. Here, the file system generates operations to load (retrieve) the requested data from disk 130 if it is not resident "in core", i.e., in the memory 124. If the information is not in memory, the file system 280 indexes into the inode file using the inode number to access an appropriate entry and retrieve a logical VBN. The file system then passes a message structure including the logical VBN to the RAID subsystem 300, which maps that logical number to a disk block number (DBN) and sends the latter to an appropriate driver (e.g., SCSI) of the disk driver subsystem 250. The disk driver accesses the DBN from disk 130 and loads the requested data block(s) in memory 124 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
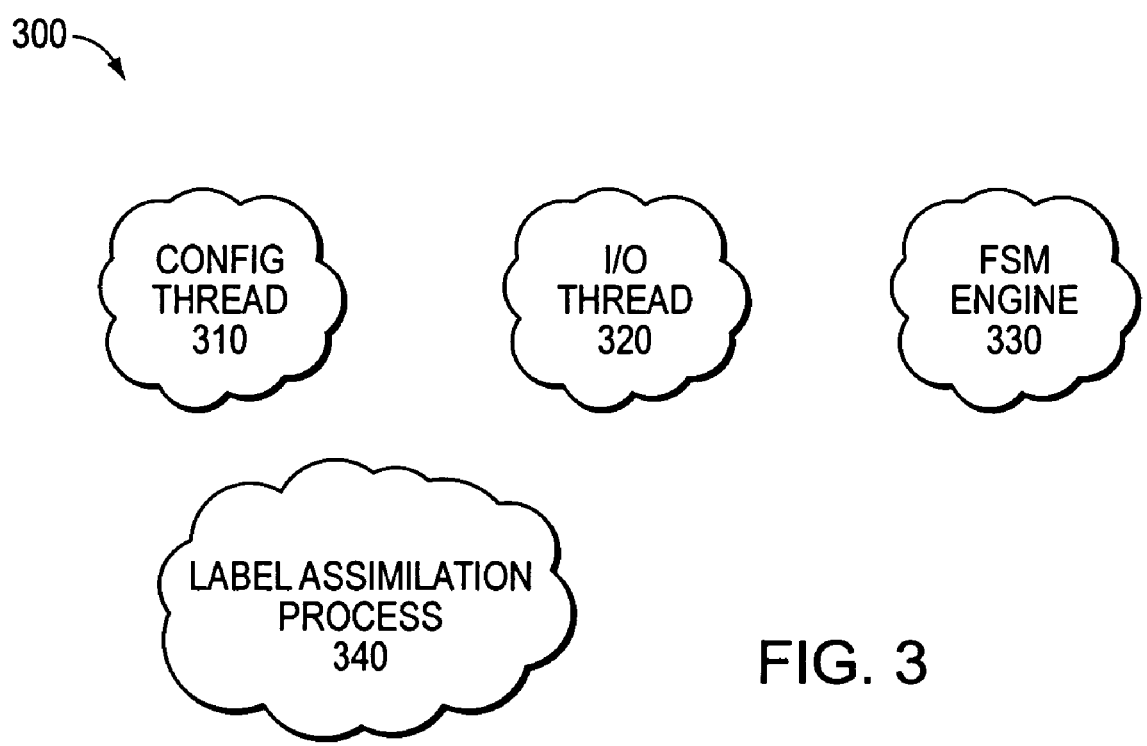
FIG. 3 is a schematic block diagram illustrating processes and threads of a RAID subsystem of the storage operating system of FIG. 2.

The present invention is implemented in the context of a configuration management framework used to implement the RAID subsystem 300 in the storage operating system 200. In a preferred embodiment, the configuration management framework provides an object-oriented approach to RAID configuration management, as described herein with respect to an implementation of the RAID subsystem. FIG. 3 is a schematic block diagram illustrating one or more modules or processes and threads of the RAID subsystem 300, wherein each process has, among other things, a (virtual) memory address space, executable code and data. A process is started with a single thread, but can create additional threads from any of its threads. The threads execute in the same memory address space and can therefore work concurrently on shared data. For example, an instantiator module implements a configuration (config) thread 310 adapted to maintain relationships among and invoke behaviors of decomposed software components ("RAID objects") that collectively form the behaviors associated with a collection of (RAID) volumes on the storage system. In addition, an I/O manager module implements an I/O thread 320 configured to issue I/O transaction requests from the RAID subsystem to the disk driver subsystem and, upon completion, process the results.

A finite state machine (FSM) module or engine 330 is used to arbitrate a set of events and states that a process or thread of the RAID subsystem may encounter. Transactional semantics isolate the behavior of state changes in the RAID subsystem from concurrent I/O operations. The framework provides a two-phase commit procedure, coordinated with updates to on-disk configuration data ("labels"). Errors during disk label updates are handled by aborting the transaction, releasing partially committed data and unwinding any pending state transitions. A state notification mechanism integrated with the FSM engine 330 propagates state changes through the threads in order to provide a coordinated behavior.

According to the configuration management framework, a volume comprises the aggregate behavior of a number of RAID objects. Each RAID object ("object") comprises operational code and static state, such as configuration information, relating to the topology of the underlying physical storage devices, e.g., disks 130, contained in disk array 160. The objects are organized into a configuration tree with configuration interfaces defining a set of services provided by one or more processes of the RAID subsystem. Although the objects may be implemented in accordance with an object-oriented programming paradigm, the present invention is not limited to such an implementation. More broadly, the objects of the configuration tree refer to abstract entities representing a logical combination/configuration of the disks. That is, the objects are used to present a view of the underlying topology of the storage array managed by the RAID subsystem.

Figure 4:
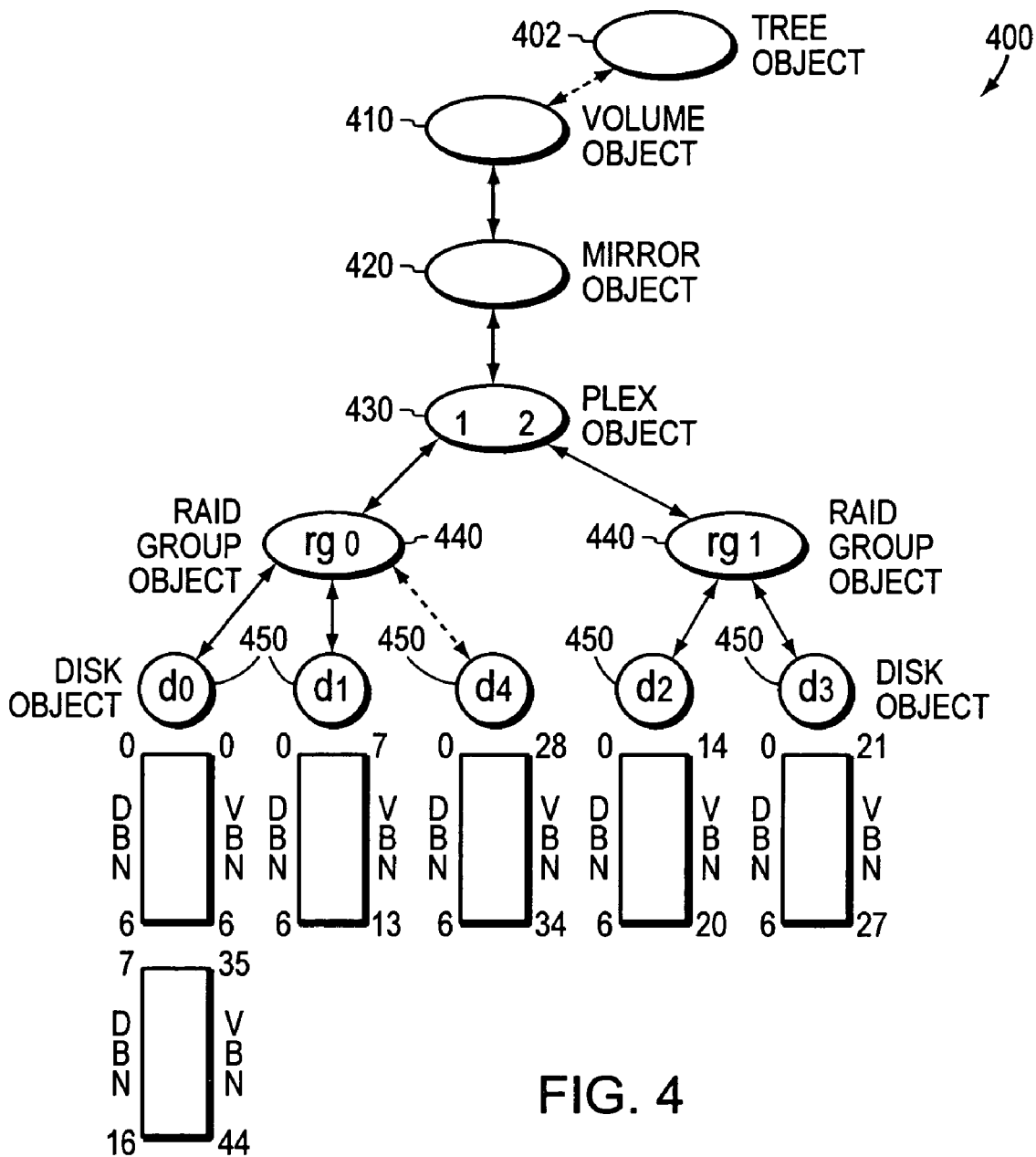
FIG. 4 is a schematic block diagram of an in-core representation of an embodiment of a RAID configuration tree in accordance with a configuration management framework that may be advantageously used with the present invention.

FIG. 4 is a schematic block diagram of an in core representation of an embodiment of a RAID configuration tree structure 400 in accordance with the configuration management framework. The configuration tree 400 comprises a plurality of objects arranged by the RAID subsystem into levels that cooperate to organize one or more physical disks into a single logical volume. References between objects (e.g., between a superior "parent" object and each of its subordinate "children" objects) are bi-directional memory address pointers that enable each child to reference its parent (and vice versa). These pointers are part of the metadata stored within each of the objects.

Objects have an associated type, with each object type providing its own implementation of the configuration interfaces. A volume is organized into a hierarchical configuration tree of objects that includes a tree object 402 responsible for coordinated behavior with the file system and a volume object 410 responsible for managing the RAID aspects of volume management. Specifically, the volume object 410 represents the (WAFL) file system at the highest level (i.e., root node) of the configuration tree 400. To that end, the volume object 410 stores metadata that describes a volume/file system, wherein the metadata includes information such as the name of the volume and address range (in physical blocks) of the volume. The name of the volume resides in a volume namespace that is exported by the UI 275 of the storage operating system 200. The logical address space of the file system is mapped to the physical (block) address space in the RAID subsystem 300.

The configuration tree 400 and, in particular, the volume object 410 represent a logical disk that is presented to the file system by the RAID subsystem as a "container" for the file system to store its data. That is, the objects of the configuration tree are organized to create an address space that resembles a single logical disk but, in reality, comprises a plurality of physical disks. In this context, the volume object 410 is equivalent to the tree object 402, wherein the tree object stores additional metadata about the logical volume that is presented to the file system. This additional metadata includes the type (level) of parity implementation configured for the particular volume (e.g., RAID-4, RAID-0, mirror_RAID-4, mirror_RAID-0, row-diagonal parity). Since the tree object is a one-to-one representation of the volume, the additional metadata stored in the tree object includes redundant information about the volume, such as its name and physical address/block range.

A next object level comprises a mirror object 420 that is responsible for coordinating one or more copies of the volume (termed "plexes") in support of data mirroring. In synchronous data mirroring, two "mirror" copies are provided that are at all times synchronized. That is, changes to the data in one mirrored copy are immediately reflected in the other mirrored copy. The two identical mirrored copies have matching address spaces that are within the volume address space and that provide identical synchronized full copies of the data in the volume.

A plex object 430 is responsible for managing an instance of a copy of volume data and thus represents each mirrored copy within another object level of the configuration tree. Whereas the mirror object 420 stores metadata that is used to coordinate one or more copies (or plexes) of the volume in support of data mirroring, each plex object 430 stores metadata that is used to manage an instance of a copy of volume data. The plex object may include an ordinal placement (e.g., 1, 2) indicating that, for example, a first part (1) of the address space is associated with a particular RAID group and that a second part (2) of the address space is associated with another RAID group.

A next object level comprises one or more RAID group objects 440 per plex object. Each RAID group object 440 contains metadata that provides data protection and I/O coordination over a set of disks. The metadata of the RAID group object includes information such as the number of disks within the RAID group and the address (block) range of each disk within the RAID group. In this context, a RAID group is defined as a number of disks and the address/block space associated with those disks. Finally, there is another object level comprising one or more disk objects 450 per RAID group object, wherein each disk object 450 contains metadata that provides data access to the physical disks 130.

The configuration tree 400 is constructed in the memory 124 of the storage system 120 by a label assimilation process 340 of the RAID subsystem 300. According to the assimilation process, each disk associated with a volume includes a disk label structure that describes its placement and association with that volume. The on-disk label is, in essence, self-describing information for each disk that is actively attached to the storage system 120. The labels are used to dynamically assemble the disks into a volume and to construct an in-core configuration tree for that volume, starting from the disk object level up to the volume object level. Therefore, a label on a disk identifies that disk's participation in a RAID group and, furthermore, that group's association with plex, mirror and, ultimately, volume objects in the configuration tree. As described herein, the label is located in a well-known location of the disk so that it can be queried by the RAID subsystem in accordance with, e.g., a discovery process during a boot operation.

Each object type instance of the configuration tree 400 comprises the following components: service interfaces, committed transactional state, pre-committed transactional state and non-transactional state. The service interfaces comprise an application programming interface (API) that the object exports to other software components. In the illustrative embodiment, the service interfaces include initialization and destruction, child object management (add, replace), online/offline, transaction management (join, commit, abort, label I/O, state change notify), virtual block management, and I/O handling (context creation/deletion, resource management, I/O throttling). Each object type defines the commit, pre-committed, and non-transactional state that it holds. The transaction management interfaces are provided as a mechanism to create and modify transactional state in a manner that is coordinated across all objects in a volume.

The basic flow of control starts with a configuration management operation issued by, e.g., the file system 280 and received by the RAID subsystem 300. The file system passes the configuration management operation in the form of a message request that specifies a target volume and defines a named operation with specific parameters. The configuration thread 310 of the RAID subsystem receives the request and determines the object (e.g., volume, RAID group) of the configuration tree 400 for the volume to which the request is directed. The configuration thread then locates the tree object 402 for the volume and invokes relevant configuration operations using service interfaces of the appropriate object. When a service interface is invoked, the object is transparently "joined" to the request prior to activation of the interface. Joining of an object to a request results in copying of the currently committed state into a pre-committed state area (called the "trans" area of the object). The trans area is a portion of memory that records changes to the object that are pending commitment. The service interface makes its changes to the trans area. If the changes to the object result in a change of the state of the object, the FSM engine 330 is invoked.

The FSM engine 330 provides a critical component in managing the interrelationship between objects in a RAID volume. Specifically, the FSM engine defines the state/event pairs that are "legal" and, for each state/event, provides a mechanism to implement the invocation and determine any subsequent state transitions. In addition, the FSM engine provides tracing mechanisms to track the set of transitions that have occurred and provides object notification for pre-committed and committed state transitions. More specifically, the FSM engine 330 is responsible for determining the new state of the object (based upon a per object type state/event table) and invoking the state notification interface of its "superior" object in the volume hierarchy. The FSM engine includes an upward notification mechanism (e.g., from child to parent object) to notify the parent object about a state change in the child object.

When the configuration request completes all service interface invocations, it requests a label commit operation to persistently store the modified state. The label commit "pulls" data from the trans area in order to construct its new version of the label data. Label commit is deemed to be successful only if all labels in a plex can be successfully written. Once all labels have been successfully written, each object that has been joined to the request is responsible for copying its trans area data back to the committed state portion of the object. If labels are not successfully written, the trans area is discarded, any disk failures are identified and resulting configuration changes are initiated, the successfully written labels are re-written with the previous state, and the original configuration request is retried.

The present invention relates to a technique for mapping the capacity of storage devices, such as disks, into any RAID group of a volume of a storage system regardless of the location of the RAID group within a VBN space of the volume. To that end, the inventive technique separates disks and mapped VBN ranges, allowing for flexibility in the description and extension of RAID group capacities, while providing disk addition policies that support location-independent disk insertion into RAID groups. The inventive technique also is directed to the disk label structure that supports the provision of multiple VBN ranges within a RAID group and within individual disks.

Moreover, the technique provides file system support for allocation and topology management of the multiple mapped VBN ranges within disks and RAID groups, as well as non-contiguous VBN ranges across the RAID groups in the volume. Note that there is a one-to-one mapping between the information stored on the disks in, e.g., DBN space, and the information organized by the file system in, e.g., VBN space. That is, each 4 kB file system block in the VBN space is mapped to a 4 kB disk block in the DBN space. An alternate embodiment of the invention may include multi-tiered mapping schemes, maps that are back-ended by multiple disks in a mirrored configuration or maps that are back-ended by non-disk storage devices (e.g., battery-backed memory).

Figure 5:
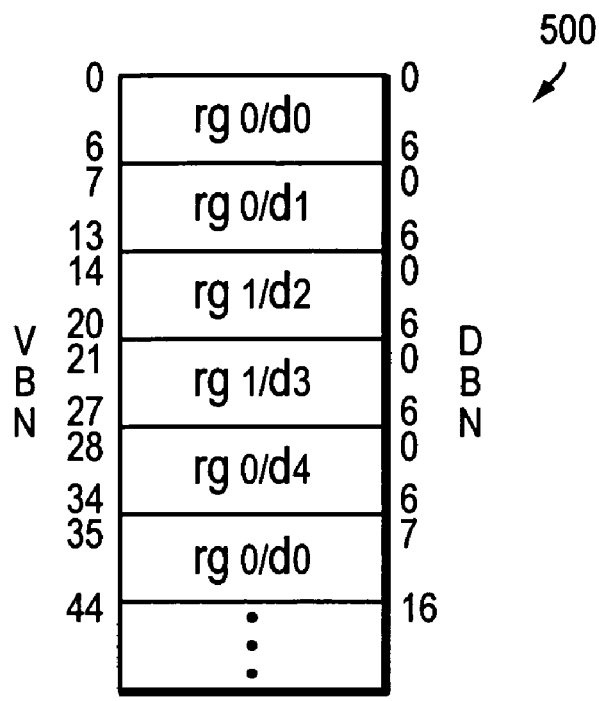
FIG. 5 is a schematic block diagram of a file system map that may be advantageously used with the present invention.

FIG. 5 is a schematic block diagram of a (WAFL) file system map that defines a VBN space for its (file system) volume. The file system map is a data structure containing information maintained by the file system to correlate ("map") the VBN space of the volume to the DBN space of all disks in the volume. Referring also to FIG. 4, data disk object 0 (d0) of RAID group object 0 (rg0) has DBNs 0-6 that are mapped to VBNs 0-6 of the volume. Similarly, d1 of rg0 has DBNs 0-6 that map to VBNs 7-13 of the volume. As disks are added to RAID groups of the volume, those disks are sequentially mapped to the VBN space, which likewise expands contiguously in accordance with a contiguous VBN-to-DBN mapping of disks in RAID groups. Notably, parity disks do not map into the file system VBN space.

Whereas the file system map contains VBN-to-DBN mapping information for all disks in the volume, a "raidmap" contains DBN-to-VBN mapping information for each disk in the volume. The raidmap is a data structure containing information maintained by the RAID subsystem to correlate the DBN space of a single disk to the VBN space of the volume. In particular, the information contained in the raidmap comprises mapping parameters that enable separation of DBN ranges on a disk from mapped VBN ranges of the volume. Each raidmap is stored on the disk label structure, i.e., a "RAID label", of a disk and generally comprises a base offset into a VBN range of the volume, a base offset into a DBN range on the disk and a size (length) of the DBN-to-VBN mapping. Each RAID label is stored at a fixed location, e.g., at the end of a disk, and functions as an on-disk database of configuration information.

Figure 6:
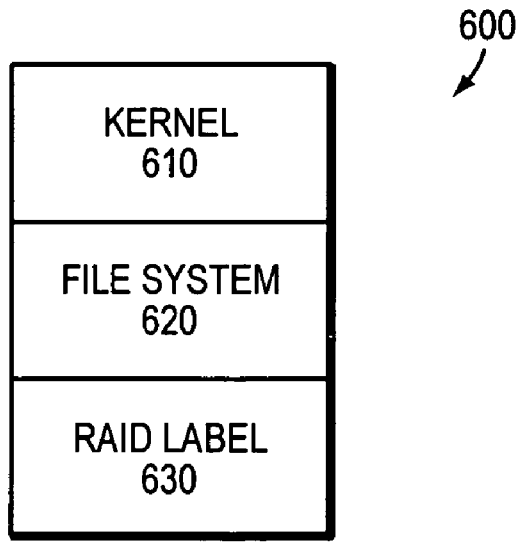
FIG. 6 is a schematic block diagram illustrating the format of a disk coupled to the storage system of FIG. 1.

FIG. 6 is a schematic block diagram illustrating the format 600 of a disk. There are various tiers of information stored on the disk, including control information outside of the DBN range of the disk and data within the DBN range. A section 620 of the disk may be used to store data within the DBN range comprising file system information, including user data (in the case of a data disk) or parity information (in the case of parity disk). Note that the DBN range may be logically apportioned into multiple pieces, per the invention, in order to support non-contiguous VBN ranges and/or VBN ranges associated with different volumes.

The control information outside the DBN range includes, but is not limited to, a table of contents that describes the entire layout of the disk (the locations of subsequent sections) and sections associated with disk ownership, RAID control information and other configuration data. In addition, as illustratively shown, a section 610 of the disk may be used to store kernel and boot image code of the storage operating system, and a section 630 of the disk may be used to store the RAID labels 630 and, in particular, the configuration information needed to describe how the particular disk fits into the volume.

The configuration information stored in the RAID label 630 describes the RAID group to which the disk belongs, along with all parent objects associated with the disk (e.g., plex, mirror, volume). Therefore, there is a region within the RAID label 630 for each parent object of the configuration tree associated with the disk storing the RAID label. The parent objects of the configuration tree (above the disk drives) are in-core memory objects that are created at the time the volume is assimilated. As noted, assimilation of a volume comprises reading (retrieving) the configuration information from all labels on all disks of the volume and then using that information to construct the configuration tree for the volume. The configuration information retrieved from the labels during assimilation includes the raidmaps used to describe the topology of the volume.

Although the raidmaps and their mapping ranges are illustratively not exposed to operators as configurable entities, the raidmap configuration may be important to system administrators when determining how to physically configure or alter a storage system. Disk addition techniques are knowledgeable about the current use of raidmap information when determining when to place new disks into a volume. I/O task components (i.e, "raidio" structures) utilize raidmaps rather than directly referencing the disks. The raidmaps also support transactional behaviors when configuration operations execute on the volume.

FIGS. 7A-7E are schematic diagrams of raidmaps that may be advantageously used with the present invention. Each raidmap contains information indicating whether the disk is a data disk (within the VBN range) or a parity disk (outside the VBN range). Each raidmap comprises mapping parameters such as a starting disk block number (dbn_start), a starting volume block number (vbn_start) and a length of DBN-to-VBN mapping. Note that these raidmaps are illustrative examples only and that their contents may include additional information. For instance, each raidmap may further include a reference to a parent RAID object (the RAID group) and a child RAID object (the disk), the amount of valid data in the map where validity is determined by the RAID group implementation (e.g., unreconstructed data is considered invalid), a reference count on the number of users of the raidmap within the system and transactional information.

Figures 7A, 7B, 7C, 7D, 7E:
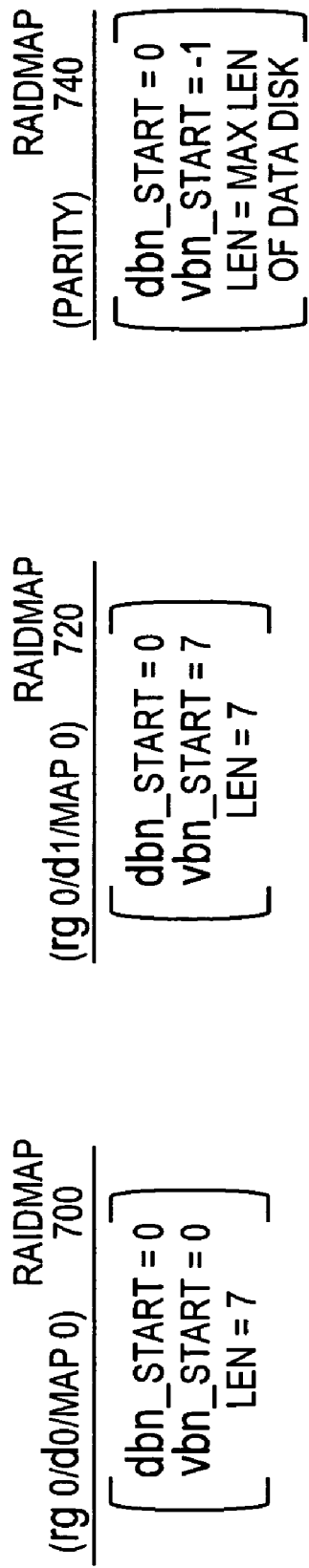
FIGS. 7A-7E are schematic diagrams of raidmaps that may be advantageously used with the present invention.

FIG. 7A depicts a first raidmap 700 for data disk 0 of RAID group 0 (e.g., rg0/d0/map0) and FIG. 7B depicts a first raidmap 720 for data disk 1 of RAID group 0 (rg0/d1/map0). Specifically, raidmap 700 contains mapping parameters including a starting disk block number (dbn_start) equal to 0, a starting volume block number (vbn_start) equal to 0 and a length of DBN-to-VBN mapping equal to 7. Note that the mapping parameters are specified in 4 kB blocks. Raidmap 720 specifies a starting disk block number (dbn_start) equal to 0, a starting volume block number (vbn_start) equal to 7 and a mapping length equal to 7. For purposes of discussion and description, the value of the length parameter is intentionally small. In a typical embodiment, the amount of space mapped by a single raidmap may cover hundreds of gigabytes or more, depending on the size of the physical or logical disk being mapped. Raidmap 700 resides in the RAID label 630 of data disk 0 and raidmap 720 resides in RAID label 630 of data disk 1. As described herein, there is sufficient space within each disk's RAID label for a plurality of raidmap "slots", each slot describing a potential mapping from a volume VBN range to the disk's DBN range. If a raidmap slot is not used, the associated raidmap data in the slot is marked "invalid".

FIG. 7C depicts a raidmap 740 for a parity disk that specifies a starting disk block number (dbn_start) equal to 0 and a starting volume block number (vbn_start) equal to a sentinel value, such as −1. It should be noted that any sentinel value may be chosen that is outside of the DBN range. Since the parity disk does not map to the VBN space of a volume, the "−1" VBN offset is used to denote that the raidmap is directed to a non-mapping parity disk, such as the parity disk in a RAID-4 level group implementation. The capacity or size of the parity disk raidmap 740 is equal to the maximum size of the largest data disk of the RAID group. Data disks in a RAID group may vary in size and the parity disk must be large enough the cover the largest data disk of the RAID group. Therefore, the length parameter of a parity disk raidmap denotes the size of the parity disk, which must be at least as large as the largest data disk of the RAID group.

A write allocator 282 of the file system 280 is "aware" of the underlying (RAID) topology of the storage devices in order to achieve performance. To that end, the write allocator uses the raidmap and its description of that topology to issue I/O operations when accessing (via write allocation) data stored in the VBN range of a volume. A topology mechanism (e.g., the raidmap cache 170) exports the raidmap information from the RAID subsystem to the write allocator. Write allocation is directed to one RAID group at a time to enable writing of full stripes across the disks of the group. In the case of the illustrative RAID-4 level implementation, parity calculation for a write allocated stripe is performed only once. Notably, write allocation is based on RAID group layout rather than VBN space. That is, the VBN space is used internally within the file system to identify blocks, but not to allocate and write data to disk(s). Instead, the RAID group layout (size) is used for write allocation.

Typically, a maximum number of disks may be specified for a RAID group of a volume and, in the absence of a specified maximum, a default maximum number of disks for a RAID group may be established. For example, assume that the maximum RAID group size for a RAID-4 level implementation is 3 disks and RAID group 0 comprises two data disks and one parity disk (not shown). Assume further that an operator wants to add a third data disk to the volume. The third data disk is thus added to a new RAID group, e.g., RAID group 1 (rg1), as data disk object 2 (d2), since the maximum number of disks in RAID group 0 has been reached.

Assume now that the operator adds two data disks (and one parity disk) to RAID group 1. These data disk objects (d2 and d3) are mapped to the VBN space of the volume in a manner that is contiguous with the data disk objects of RAID group object 0. That is, d2 has DBNs 0-6 that map to VBNs 14-20 of the volume and d3 has DBNs 0-6 that map to VBNs 21-27 of the volume. Once the maximum number of disks in a RAID group has been satisfied and additional disks are inserted into a next RAID group, the size of a previous RAID group typically cannot change, e.g., cannot increase. This is due, in part, to the contiguous VBN-to-DBN mapping for, e.g., write allocation in the file system. In other words, VBN ranges typically cannot be mixed within RAID groups.

According to an aspect of the inventive technique, a new disk may be added to a RAID group (e.g., RAID group object 0) that is not the most recently established, i.e., the "last" RAID group (e.g., RAID group object 1), of a volume. The ability to add a new disk to a RAID group that is not the last RAID group is achieved because each disk stores a raidmap describing the DBN-to-VBN mapping of its blocks and because that mapping information (along with other configuration information) is "cached" (stored) in memory (raidmap cache 170) for use by the file system. Specifically, the write allocator advantageously uses the mapping parameters of the raidmap to determine the noncontiguous VBN-to-DBN mapping of a disk (e.g., the disk newly inserted) of the RAID group. Configuration changes to the physical disks managed by the RAID subsystem are reflected as changed configuration information that is cached in raidmap cache 170 for use by the write allocator 282 of the file system 280. As long as the write allocator is aware of the underlying changed topology (via the raidmaps), there is no performance impact by having noncontiguous VBN-to-DBN mappings in a RAID group.

For example, assume data disk object d4 is added to RAID group object 0 (rg0) even though data disk objects d2-d3 are members of RAID group object 1. FIG. 7D depicts a first raidmap 760 for d4 of rg0 (e.g., rg0/d4/map0). Raidmap 760 specifies a starting disk block number (dbn_start) equal to 0, a starting volume block number (vbn_start) equal to 28 and a length of DBN-to-VBN mapping equal to 7. Thus, the DBN-to-VBN mapping for newly inserted d4 is DBNs 0-6 mapped to VBNs 28-34. Although this results in a noncontiguous VBN-to-DBN mapping within RAID group 0, the raidmaps of the present invention enable the RAID subsystem to support such noncontiguous mappings and, in particular, the ability to have multiple VBN ranges per RAID group.

Another aspect of the present invention relates to the mapping of multiple VBN ranges to the DBN space of a disk through the ability to store more than one raidmap in a RAID label on each disk. This aspect of the invention is particularly useful in the event of a failure to a disk of a RAID group and the replacement of that failed disk with a larger disk. For example, assume data disk d0 of RAID group 0 fails and a new disk is added to RAID group 0 to replace the failed disk. The data stored on the failed disk is reconstructed on the replacement disk in accordance with a conventional reconstruction process using the constituent data/parity stored on the other disks of the RAID group. If the replacement disk has the same size as the failed disk, then the DBN-to-VBN mapping of the replacement disk is similar to that of the failed disk. However, if the replacement disk is larger than the failed disk, the present invention enables use of the additional space on the larger disk through the use of second raidmap for the disk.

There is initially one raidmap 700 for data disk object 0 of RAID group object 0 (rg0/d0/map0). If d0 fails and that disk is replaced with a larger disk, the first portion of the larger disk is used to reconstruct the failed d0, such that DBNs 0-6 are mapped to VBNs 0-6 in the volume. In addition, the second portion of the larger disk is used to map into the volume at the end of the VBN range that has been previously mapped. FIG. 7E depicts a second raidmap 780 for data disk object 0 of RAID group object 0 (e.g., rg0/d0/map1) pertaining to the second portion of the larger disk inserted into RAID group 0. The raidmap 780 specifies a starting disk block number (dbn_start) equal to 7, a starting volume block number (vbn_start) equal to 35 and a length of DBN-to-VBN mapping equal to 10.

Advantageously, this aspect of the present invention provides a means for expanding the storage space of an existing file system when mapping the capacity of a new disk into a volume, wherein the new disk is larger than the disks of the volume, and making use of the additional space on the larger disk. An example of such a situation involves replacing a failed disk with a larger disk of a RAID group. The expansion aspect of the invention allows efficient use of inevitable increases in the sizes of disks that may be used as replacement disks for previously installed disks of a storage system. The expansion aspect of the present invention also provides a more efficient approach to utilizing the extra space on replacement disks as compared to prior approaches by allowing use of the additional space on replacement disks in an efficient manner that is "online" and involves no disruption to the file service provided by the storage system to an operator/client.

Therefore when mapping the capacity of a disk into any RAID group of a volume, such as when replacing a failed disk with a larger disk, the present invention enables creation of (i) a first raidmap to reconstruct the failed disk using a first portion of the large disk and (ii) a second raidmap to map a second portion of the large disk into the VBN space of the file system volume. To that end, the invention allows storage of two raidmaps in the RAID label of a particular disk. As noted, there is space within each RAID label on each disk for many raidmaps.

Note that if a disk fails, a disk error-handling process modifies the state of the raidmap to indicate that maps associated with the disk are "stale" (no longer valid). Disk error handling "flips" the stale map with a new map indicating that a "hole" exists in the VBN space corresponding to the size of the stale map. The stale map remains in memory until all uses by raidio structures and other components (e.g., the raidmap cache) of the RAID subsystem have terminated. Meanwhile, a new map (marked as "unmapped" space) is integrated into the RAID group's raidmap configuration. The raidio structures and components recognize the stale map condition as part of their error handling, and typically abort and restart with the RAID group's updated raidmap configuration.

Flipping of a map may occur when a disk is inserted into a RAID group to replace a failed disk or when a disk is removed from a RAID group. Map flipping is designed to operate transactionally, allowing for concurrent I/O operations to view the configuration in a coherent manner. When new disks are added to extend RAID group capacity, transactional behaviors and file system semantics prevent access to the newly added VBN range until the operation has been committed to disk.

Another advantage of the expansion feature of the invention is the ability to move an existing volume from smaller disks to larger disks using synchronous mirroring and the additional mapping capabilities within those larger disks. For example, assume it is desired to "mirror" an existing volume with disks of capacity size X, e.g., 36 gigabytes (GB), to a new volume with disks of capacity 2X, e.g., 72 GB. In the illustrative embodiment, the RAID subsystem 300 desires a mirroring behavior using exact sized disks, implying that only half of the disk capacity is initially used in the new volume mirror. Once the mirror is synchronized, the original volume mirror may be disabled, leaving the volume with only 2X disks. The inventive technique enables the volume to extend the additional capacity, resulting in multiple VBN ranges for the RAID group.

Figure 8:
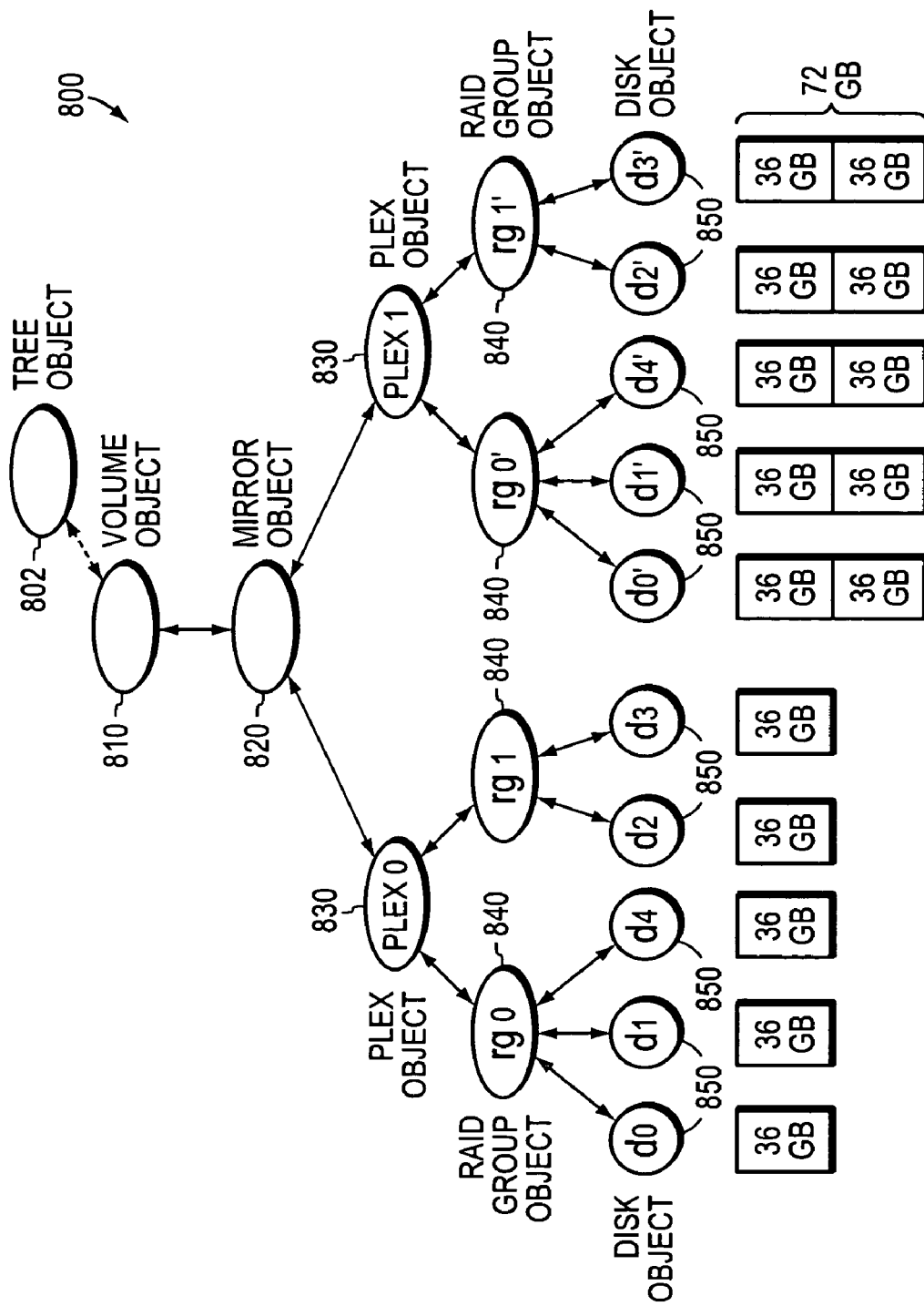
FIG. 8 is a schematic block diagram of an in-core representation of another embodiment of a RAID configuration tree in accordance with the configuration management framework.

FIG. 8 is a schematic block diagram of an in-core representation of another embodiment of a RAID configuration tree 800 in accordance with the configuration management framework. As with the configuration tree 400, configuration tree 800 includes a tree object 802 responsible for coordinated behavior with the file system, a volume object 810 responsible for managing the RAID aspects of volume management and a mirror object 820 responsible for coordinating one or more plexes in support of data mirroring. Here, the configuration tree 800 and, in particular, the volume object 810 represent a logical disk that is presented to the file system by the RAID subsystem as a synchronous mirror container for the file system to store its data. Therefore, two plex objects 830 (plex 0 and plex 1) are provided, wherein each plex essentially manages a full copy of the volume data. In addition, the configuration tree 800 includes four RAID group objects 840 responsible for data protection and I/O coordination over a set of disks, and a plurality of disk objects 850 responsible for data access to the physical disks 130.

Assume that the existing plex (plex 0) has disks of capacity size X (e.g., 36 GB) and that the new "mirrored" plex (plex 1) has disks of capacity 2X (e.g., 72 GB). Because of the mirroring behavior of desired by the RAID subsystem 300, there is a one-to-one correspondence between each disk 850 of each plex 830, i.e., the disks contain the same data and map into the same VBN space. Thus, if RAID group object rg0 has data disk objects d0, d1 and d4, then rg0' has d0', d1' and d4'. In addition, the mirrored disks must have the same sized raidmaps; therefore, initially only an upper portion (36 GB) of the 72 GB disks are used to provide symmetry with the disks in the other plex.

A resynchronization (resync) operation is then performed which essentially copies all the data with the original 36 GB disks to the mirrored 72 GB disks. While the resync operation is in progress, an operator/client has full access to the data stored on the original 36 GB disks. From the perspective of the file system, no changes have occurred to the underlying topology of the volume. That is, the file system has access to its entire VBN space with respect to reading or writing data to the mapped DBNs on the disks. Transparently, though, the RAID subsystem is copying the data from the original 36 GB disks to the mirrored 72 GB disks.

Once the data is fully copied to the mirrored plex, a normal mirrored state is reached wherein there is full redundancy such that any access (read or write operation) to data served by the storage system occurs on disks of both plexes. However, the additional storage space on the 72 GB disks cannot be used because there are no equivalent spaces on the disks of the other original plex. Since all the user data is now stored on the 72 GB disks of the second plex, the original plex and its constituent disks can be "destroyed" and replaced with similarly sized 72 GB disks. Here, a goal is to move or migrate an existing volume having 36 GB disks to larger 72 GB disks while also migrating the volume from an unmirrored to mirrored configuration. Once the original plex is destroyed, the additional space on the 72 GB disks can be used and, therefore, mapped into the VBN space of the volume since there is no longer any restriction to its use. As a result, the file system VBN space can be "dynamically" increased to take advantage of the additional physical storage space (DBN space) on the newly inserted 72 GB disks.

According to the invention, each 72 GB disk has two raidmaps used to map the physical disk space (DBN) on the disk to the volume space (VBN) in a manner that is transparent to the file system, as long as that configuration information is cached in memory for use by the file system. That is, using the raidmaps and configuration information, the file system can read or write to all the mapped ranges on the disks. Since the original plex has been destroyed and the 36 GB disks have been removed from the storage system, those disks can be replaced with 72 GB disks and recreate the original plex using those disks. Thereafter, the data stored on the other plex is copied over onto the newly created plex in accordance with a mirror resync operation, wherein the data that is copied includes the raidmaps. Throughout the entire process of replacing original 36 GB disks with larger 72 GB disks, the file system continues to provide file service for the data stored on the disks and, in fact, the file system is unaware of the configuration change.

By providing two full copies of the data for a volume, the use of mirroring in connection with the present invention advantageously enables (i) "off-lining" of a plex (bringing the plex offline), (ii) unplugging of the disks of a disk shelf from the storage system, (iii) relocating of the disk shelf to another location, (iv) reconnecting of the disk shelf and disks with the storage system and then (v) "onlining" the plex (bringing the plex online) without disturbing file service to the information stored on the volume. The present invention obviates the burdensome procedure of the prior art because only one volume is utilized between the two plexes.

Assume now that a disk in one plex (e.g., d0 in plex 0) is replaced by a yet larger disk d0. In order to extend the DBN-to-VBN mappings on replacement disk d0 to utilize the extra space on that disk, the mirrored disk in the mirrored plex (e.g. d0' in plex 1) must also be extended to utilize the equivalent amount of extra space in order to maintain symmetry between the mirrored copies of data. Therefore, a restriction with respect to the present invention when utilized in a mirroring arrangement is that the additional space provided by a larger replacement disk may not be utilized until the "mirrored" disk is replaced with an equivalently sized disk.

Advantageously, the present invention isolates disks from VBN ranges, providing flexibility in RAID group topologies. Isolation of VBN ranges from disks further allows for dynamic extension of the VBN range at the RAID level without requiring reorganization of the existing blocks in the file system. The inventive technique supports dynamic extension of capacity using existing, but formerly unused, disk space. Moreover, the on-disk label structure contains placeholders for multiple per-disk VBN range data, thereby facilitating instantiation of the raidmap information when a volume is brought into the system during initialization.

While there has been shown and described an illustrative embodiment for mapping the capacity of disks into any RAID group location within a VBN space of a volume of a storage system, it is to be understood that there are other advantages provided by the technique of the present invention. For example, another application of the present invention enables a disk to utilize its physical disk space (DBN ranges) among different volumes of the storage system. Typically, the physical DBN storage space of a disk is restricted to residing in the same volume. The use of multiple raidmaps per disk allows a second portion of the DBN space on a disk to reside in another volume that is different from the volume within which a first portion of the disk's DBN space resides. The configuration information stored in the RAID label must be extended to differentiate between the set of objects associated with a first portion of the physical disk space and the set of objects associated with the second portion of the physical disk space.

In summary, restrictions applicable to previous RAID subsystems include (i) each disk had exactly one raidmap stored in each RAID label on the disk and (ii) the ordering of disks as they appeared in the file system map is exactly the same as the ordering of disks in the RAID groups. The present invention relaxes those restrictions by (i) allowing each disk to have one or more raidmaps in each RAID label and (ii) allowing ordering of disks as they appear in the file system map to be different from the ordering of disks in the RAID groups (i.e., a disk can be added into a RAID group that is other than the last established RAID group).

A preferred embodiment of the invention has been described herein with reference to a file server having a storage operating system with a file system layer and a RAID subsystem (among other components), which manages file semantics in order to access data organized in files. It should be understood, however, that the invention can be practiced in any system or device that maps the capacity of disks into any RAID group of a volume of a storage system, particularly in light of configuration management changes. One type of system or device in which the invention can be embodied is designed to perform a data storage function, and if so, may perform data-related operations, e.g., in response to data access requests. Such requests may use file-based and/or block-based semantics, depending on the implementation and, correspondingly, the system or device may organize data in files or in another manner. Moreover, such systems and devices may or may not incorporate features and functions described herein, such as, for example, a file system layer or a RAID subsystem, or may combine or otherwise modify their operation, without departing from the principles of the invention.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for operating a computer data storage system, comprising:
    assigning volume block numbers (VBNs) to a volume;
    assigning disk block numbers (DBNs) to each of a plurality of physical disks, the storage system including the physical disks;
    mapping the VBNs to the DBNs of the plurality of physical disks by mapping parameters, the mapping parameters to map a range of VBN numbers to a selected range of DBNs on a selected physical disk of the plurality of physical disks;
    using a plurality of mapping parameters to map a selected VBN range of the VBN numbers to a plurality of DBN ranges on the selected physical disk of the plurality of physical disks, the plurality of mapping parameters arranged as one map;
    creating a plurality of maps for the selected physical disk, the plurality of maps including the one map;
    creating a plurality of map slots on the selected physical disk; and
    storing a selected map of the plurality of maps in a selected one of the slots of the plurality of map slots on the selected physical disk.

2. The method of claim 1, further comprising:
    arranging the plurality of physical disks into one or more RAID groups.

3. The method of claim 1, further comprising:
    organizing the plurality of physical disks as one or more physical disks supporting a volume.

4. The method of claim 1, further comprising:
    mapping a range of VBNs to a range of DBNs of the selected physical disk of the plurality of physical disks.

5. The method of claim 1, further comprising:
    mapping a plurality of VBN ranges to the selected physical disk to produce a noncontiguous VBN-to-DBN mapping on the selected physical disk.

6. The method of claim 1, further comprising:
    mapping a base offset into a VBN range of the volume, a corresponding base offset into a DBN range of a related physical disk, and a size of DBN-to-VBN mapping.

7. The method of claim 1, further comprising:
    exporting the mapping parameters from the plurality of physical disks to a memory of the storage system.

8. A computer storage system, comprising:
    a storage operating system configured to assign volume block numbers (VBNs) to a volume;
    a plurality of disks, each disk of the plurality of disks assigned disk block numbers (DBNs);
    the storage operating system further configured to use mapping parameters by mapping the VBNs to the DBNs of the plurality of disks, the mapping parameters further configured to map a range of VBN numbers to a selected range of DBNs on a disk of the plurality of disks;
    a plurality of the mapping parameters configured to map a selected VBN range of the contiguous range of the VBN numbers to a plurality of DBN ranges on a selected disk of the plurality of disks, the plurality of mapping parameters arranged as a first map;
    a disk file configured to store the plurality of mapping parameters to the selected disk to provide a mapping of non-contiguous VBNs to the selected disk;
    a new disk to be added to the plurality of physical disks;
    a plurality of maps created for the new disk, the plurality of maps including the first map;
    a plurality of map slots created on the new disk; and
    a selected map of the plurality of maps stored in a selected one of the slots of the plurality of map slots on the new disk.

9. The apparatus of claim 8, further comprising:
the plurality of disks organized into a RAID group.

10. The apparatus of claim 8, further comprising:
a RAID subsystem configured to organize the plurality of disks into one or more RAID groups.

11. The apparatus of claim 8, further comprising:
a plurality of ranges of VBNs configured to map to a plurality of ranges of DBNs of the selected disk of the plurality of disks to provide the mapping of noncontiguous VBNs to the new disk.

12. The apparatus of claim 8, further comprising:
input/output operations of the storage operating system to write noncontiguous VBN range on the new disk.

13. The apparatus of claim 8, further comprising:
the plurality of mapping parameters stored on the disk label file includes:
    a base offset into a VBN range of the volume, a base offset into a DBN range corresponding to the VBN range, and a size of DBN-to-VBN mapping included in the mapping parameters.

14. The apparatus of claim 8, further comprising:
a subsystem to export the mapping parameters to a memory of the storage system.

15. A method for operating a storage system in the event of a disk failure, comprising:
    assigning a range of volume block numbers (VBNs) to a volume;

assigning disk block numbers (DBNs) to each of a plurality of physical disks, the storage system including the physical disks;
creating a first mapping parameters to map a first range of VBN numbers to a first selected range of DBNs to reconstruct a failed physical disk using a first portion of a replacement disk;
creating a second mapping parameters to map a second range of VBN numbers to a second selected range of DBNs on a second portion of the replacement disk;
creating a first disk map using the first mapping parameters;
creating a second disk map using the second mapping parameters
creating a plurality of map slots on the replacement disk;
storing the first disk map in a first map slot of the plurality of map slots;
storing the second disk map in a second map slot of the plurality of map slots;
reconstructing a failed disk using the first disk map stored in the first map slot of the replacement disk; and
causing the storage system to flip from the first disk map to the second map stored in the second map slot of the replacement disk to provide an additional storage capacity of the replacement disk to the storage system.

16. The method of claim 15, further comprising:
replacing the failed physical disk with a larger disk.

17. The method of claim 16, further comprising:
mapping a capacity of the larger disk into group the storage system.

18. The method of claim 15, further comprising:
enabling separation of a plurality of DBN ranges of a DBN space of the replacement disk into a plurality of VBN ranges of the volume.

19. The method of claim 15, further comprising:
configuring the plurality of disks into a RAID group of the storage system, the RAID group managing storage and retrieval of information, including the mapping parameters.

20. The method of claim 19, further comprising:
exporting the mapping parameters from the RAID group to a write allocator of the storage system, the write allocator using the mapping parameters in performing input/output operations.

21. The method of claim 15, further comprising:
a using the second portion of the replacement disk for an extended range of the VBN space.

22. The method of claim 21, further comprising:
using a replacement disk having greater capacity than the failed disk; and
mapping an extended range of the VBN space into a portion of a disk block number (DBN) space of the replacement disk, the portion of the DBN space obtained from a capacity exceeding a capacity of the failed disk.

23. The method of claim 1 further comprising:
storing the mapping parameters as a data structure.

24. The storage operating system of claim 8 further comprising:
the mapping parameters configured as a data structure.

25. The system of claim 8 further comprising:
the mapping parameters further configured to correlate a base offset into a VBN range of the volume, a corresponding base offset into a DBN range of a related disk, and a size of DBN-to-VBN mapping.

26. The method of claim 15 further comprising:
storing the mapping parameters as a data structure.

27. The method of claim 15 further comprising:
mapping a base offset into a VBN range of the volume, a corresponding base offset into a DBN range of a related disk, and a size of DBN-to-VBN mapping.

28. A method for operating a storage system, comprising:
assigning a volume block numbers (VBNs) to a volume;
assigning a disk block numbers (DBNs) to each of a plurality of disks, the storage system including the disks;
correlating the VBNs to the DBNs of the plurality of disks by parameters, the parameters to correlate a range of VBN numbers to a selected range of DBNs on a selected disk of the plurality of disks;
storing the parameters on the selected disk to provide a correlation of noncontiguous VBN numbers to the DBN numbers of the selected disk;
adding a new disk to the plurality of disks;
creating a plurality of maps for the new disk;
creating a plurality of map slots on the new disk; and
storing a selected map of the plurality of maps in a selected one of the slots of the plurality of map slots on the new disk.

29. The method of claim 28 further comprising:
using placeholders for multiple per-disk VBN range data on the selected disk.

30. The method of claim 28 further comprising:
separating disk block number (DBN) ranges from correlated VBN ranges of the volume.

31. The method of claim 28 further comprising:
determining noncontiguous VBN-to-DBN correlations within a RAID group.

32. The method of claim 28 further comprising:
dynamically extending the VBN range at a RAID level without requiring reorganization of existing blocks in the storage system.

33. The method of claim 28 further comprising:
replacing a failed disk with a larger disk.

34. The method of claim 28 further comprises:
storing the first and second parameters on a location on the selected disk.

35. The method of claim 28 wherein the parameters further comprises:
maintaining information of a file system to correlate a VBN space of the volume to a DBN space of disks in the volume.

36. The method of claim 28 further comprising:
managing multiple correlated VBN ranges within disks and RAID groups, as well as noncontiguous VBN ranges across the RAID groups in the volume.

37. The method of claim 28 further comprising:
correlating a base offset into a VBN range of the volume, a corresponding base offset into a DBN range of a related disk, and a size of DBN-to-VBN correlation.

38. The method of claim 28 further comprising:
storing the parameters in a RAID group.

39. The method of claim 28 further comprising:
storing a disk number in the parameters.

40. The method of claim 28 further comprising:
storing a map number in the parameters.

41. The method of claim 28 further comprising:
storing the parameters as a data structure.

42. The method of claim 28 further comprising:
storing the parameters in a cache.

43. The method of claim 28 further comprising:
describing a topology of the volume by the parameters.

44. A computer readable storage media having program instructions for execution on a processor for a method of operating a storage system, the method comprising:

assigning volume block numbers (VBNs) to a volume;
assigning disk block numbers (DBNs) to each of a plurality of disks, the storage system including the disks;
creating a first parameters to correlate a first range of VBN numbers to a first selected range of DBNs;
creating a second parameters to correlate a second range of VBN numbers to a second selected range of DBNs;
creating a first disk map using the first mapping parameters;
creating a second disk map using the second mapping parameters
creating a plurality of map slots on a selected physical disk;
storing the first disk map in a first map slot of the plurality of map slots;
storing the second disk map in a second map slot of the plurality of map slots;
reconstructing a failed disk using the first disk map stored in the first map slot of the selected physical disk; and
causing the storage system to flip from the first disk map to the second map stored in the second map slot of the selected physical disk to provide an additional storage capacity of the selected physical disk to the storage system.

45. A storage operating system apparatus, comprising:
the storage operating system configured to assign volume block numbers (VBNs) to a volume;
the storage operating system further configured to assign disk block numbers (DBNs) to each of a plurality of disks, the storage system including the disks;
the storage operating system further configured to correlate the VBNs to the DBNs of the plurality of disks by parameters, the parameters configured to correlate a range of VBN numbers to a selected range of DBNs on a selected disk of the plurality of disks;
the storage operating system further configured to create a first parameters to correlate a first range of VBN numbers to a first selected range of DBNs;
the storage operating system further configured to create a second parameters to correlate a second range of VBN numbers to a second selected range of DBNs;
the selected disk configured to store the first and second parameters to provide a correlation of non-contiguous VBN numbers to the selected disk;
a new disk added to the plurality of disks;
a plurality of maps created for the new disk;
a plurality of map slots created on the new disk; and
a selected map of the plurality of maps stored in a selected one of the slots of the plurality of map slots on the selected physical disk.

46. A computer readable storage media having program instructions for execution on a processor to operate a storage system, the method comprising:
assigning volume block numbers (VBNs) to a volume;
assigning disk block numbers (DBNs) to each of a plurality of disks, the storage system including the disks;
using a plurality of parameters to correlate a selected VBN range of the range of VBN numbers to a plurality of DBN ranges on disks of the plurality of physical disks;
storing the plurality of parameters for the selected disk to the selected disk to provide a correlation of non-contiguous VBN numbers to the selected disk;
adding a new disk to the plurality of disks;
creating a plurality of maps for the new disk;
creating a plurality of map slots on the new disk; and
storing a selected map of the plurality of maps in a selected one of the slots of the plurality of map slots on the new disk.

47. A computer readable storage media having program instructions for execution on a processor for a method of operating a storage system in the event of a disk failure, the method comprising:
assigning volume block numbers (VBNs) to a volume;
assigning disk block numbers (DBNs) to each of a plurality of disks, the storage system including the disks;
creating a first parameters to correlate a first range of VBN numbers to a first selected range of DBNs to reconstruct a failed disk using a first portion of a replacement disk;
creating a second parameters to correlate a second range of VBN numbers to a second selected range of DBNs;
creating a plurality of map slots on the replacement disk;
creating a first new map for the replacement disk, the first new map mapping VBN space to DBN space in accordance with a map of the failed disk, and storing the first new map in a first map slot of the plurality of map slots;
reconstructing the failed disk onto the replacement disk using the first new map;
mapping new VBN numbers for volumes in the storage system to new DBN numbers of the additional disk capacity of the replacement disk using a second new map, the second new map including the first new map;
storing the second new map into a second map slot of the plurality of map slots; and
causing the storage system to flip from the first new map to the second new map to provide the additional storage capacity of the replacement disk to the storage system.

48. A method for operating a computer storage system, comprising:
assigning volume block numbers (VBNs) to a volume;
assigning disk block numbers (DBNs) to each of a plurality of disks, the storage system including the disks;
using a plurality of parameters to correlate a selected VBN range of the range of VBN numbers to a first selected DBN range on disks of the plurality of disks;
removing a failed disk from the storage system
adding a new disk to the plurality of disks;
creating a plurality of map slots on the new disk;
creating a first new map for the new disk, the first new map mapping VBN space to DBN space in accordance with a map of the failed disk, and storing the first new map in a first map slot of the plurality of map slots;
reconstructing the failed disk onto the new disk using the first new map;
mapping new VBN numbers for volumes in the storage system to new DBN numbers of the additional disk capacity of the new disk using a second new map, the second new map including the first new map;
storing the second new map into a second map slot of the plurality of map slots; and
causing the storage system to flip from the first new map to the second new map to provide the additional storage capacity of the new disk to the storage system.

49. A method for operating a storage system, comprising:
assigning volume block numbers (VBNs) to a volume;
assigning disk block numbers (DBNs) to each of a plurality of storage devices, the storage system including the storage devices;
utilizing data structures to map VBN ranges into a DBN space of each storage device of the plurality of storage devices, wherein each data structure includes mapping parameters;
storing the data structure for each storage device to each storage device to provide a mapping of non-contiguous VBNs; and adding a new storage device to the plurality of storage devices;

creating a plurality of map slots on the new storage device;

creating a first new map for the new storage device, the first new map mapping VBN space to DBN space of the new storage device, the DBN space of the first new map chosen to agree with DBN space of existing storage devices;

storing the first new map in a first map slot of the plurality of map slots;

mapping new VBN numbers for volumes in the storage system to new DBN numbers of an additional storage device capacity of the new storage device using a second new map, the second new map including the first new map;

storing the second new map into a second map slot of the plurality of map slots; and causing the storage system to flip from the first new map to the second new map to provide the additional storage capacity of the new storage device to the storage system.

50. The method as in claim 1, further comprising:

flipping the computer data storage system from using a first map stored in a first map slot of the plurality of map slots to using a second map stored in a second map slot of the plurality of map slots; and operating transactionally to allow for concurrent I/O operations and to view a configuration of the computer data storage system in a coherent manner.

51. The computer storage system of claim 8, further comprising:

the first map stored in a first map slot of the plurality of map slots and a second map stored in a second map slot of the plurality of map slots; and a process to flip the storage system from using the first map to using the second map while operating transactionally to allow for concurrent I/O operations and to view a configuration of the computer data storage system in a coherent manner.

52. The method of claim 15, further comprising:

causing the storage system to flip from the first disk map to the second disk map while operating transactionally to allow for concurrent I/O operations and to view a configuration of the computer data storage system in a coherent manner.

53. The storage operating system apparatus of claim 45, further comprising:

a new map stored in a first map slot of the plurality of map slots of the new disk; and a process to flip the storage system to using the new map while operating transactionally to allow for concurrent I/O operations and to view a configuration of the computer data storage system in a coherent manner.

54. The method of claim 48, further comprising:

causing the storage system to flip from the first new map to the second new map while operating transactionally to allow for concurrent I/O operations and to view a configuration of the computer data storage system in a coherent manner.

55. The method of claim 49, further comprising:

causing the storage system to flip from the first new map to the second new map while operating transactionally to allow for concurrent I/O operations and to view a configuration of the computer data storage system in a coherent manner.

56. A method for operating a computer data storage system, comprising:

assigning volume block numbers (VBNs) to a volume;

assigning data storage device block numbers (DBNs) to each of a plurality of physical data storage devices, the storage system including the physical data storage devices;

mapping the VBNs to the DBNs of the plurality of physical data storage devices by mapping parameters, the mapping parameters to map a range of VBN numbers to a selected range of DBNs on a selected physical data storage device of the plurality of physical data storage devices;

creating a plurality of VBN to DBN maps for the selected physical data storage device;

storing the plurality of VBN to DBN maps on the selected physical data storage device;

operating the data storage device using a first map of the plurality of VBN to DBN maps; and causing the selected physical data storage device to flip from the first map to a second map of the plurality of VBN to DBN maps stored on the selected physical data storage device.

57. The method of claim 56, further comprising:

using a disk as the selected physical data storage device.

58. The method of claim 56, further comprising:

using a RAID system of disks as the selected physical data storage device.

59. The method of claim 56, further comprising:

using a computer readable media as the selected physical data storage device.

60. The method of claim 56, further comprising:

using an attached array of writable storage device media as the selected physical data storage device.

61. The method of claim 56, further comprising:

using a video tape as the selected physical data storage device.

62. The method of claim 56, further comprising:

using an optical media as the selected physical data storage device.

63. The method of claim 56, further comprising:

using a magnetic tape as the selected physical data storage device.

64. The method of claim 56, further comprising:

using a bubble memory as the selected physical data storage device.

65. The method of claim 56, further comprising:

using an electronic random access memory as the selected physical data storage device.

66. The method of claim 56, further comprising:

using a micro-electro mechanical media as the selected physical data storage device.

67. The method of claim 56, further comprising:

removing a failed physical data storage device from the computer data storage system, the failed physical data storage device having a first data stored thereon;

introducing a new physical data storage device into the computer data system to replace the failed physical data storage device;

creating a first VBN to DBN map for the new physical data storage device, the first VBN to DBN map to store data originally stored on the failed physical data storage device on the new physical data storage device;

creating a second VBN to DBN map for the new physical data storage device, the second VBN to DBN map to assign new VBN space to new DBN space provided by the new physical data storage device;

reconstructing the first data stored on the failed physical data storage device using the first VBN to DBN map;

causing the computer data storage device to flip from using the first map to using the second map to provide the new DBN space to the computer data storage system.

68. The method as in claim 56, further comprising:
adding a new physical data storage device to the computer data storage system; creating a new VBN to DBN map for the new physical data storage device;
integrating the new VBN to DBN map into the computer data storage system to provide new storage capacity to the computer data storage system.

69. A computer data storage apparatus, comprising:
volume block numbers (VBNs) assigned to a volume;
data storage device block numbers (DBNs) assigned to each of a plurality of physical data storage devices, the storage system including the physical data storage devices;
a processor of the computer data storage system to,
map the VBNs to the DBNs of the plurality of physical data storage devices by mapping parameters, the mapping parameters to map a range of VBN numbers to a selected range of DBNs on a selected physical data storage device of the plurality of physical data storage devices;
create a plurality of VBN to DBN maps for the selected physical data storage device;
store the plurality of VBN to DBN maps on the selected physical data storage device;
operate the data storage device using a first map of the plurality of VBN to DBN maps; and
cause the selected physical data storage device to flip from the first map to a second map of the plurality of VBN to DBN maps stored on the selected physical data storage device.

70. The apparatus of claim 69, further comprising:
a disk used as the selected physical data storage device.

71. The apparatus of claim 69, further comprising:
a RAID system of disks used as the selected physical data storage device.

72. The apparatus of claim 69, further comprising:
a computer readable media used as the selected physical data storage device.

73. The apparatus of claim 69, further comprising:
an attached array of writable storage device media used as the selected physical data storage device.

74. The apparatus of claim 69, further comprising:
a video tape used as the selected physical data storage device.

75. The apparatus of claim 69, further comprising:
an optical media used as the selected physical data storage device.

76. The apparatus of claim 69, further comprising:
a magnetic tape used as the selected physical data storage device.

77. The apparatus of claim 69, further comprising:
a bubble memory used as the selected physical data storage device.

78. The apparatus of claim 69, further comprising:
an electronic random access memory used as the selected physical data storage device.

79. The apparatus of claim 69, further comprising:
a micro-electro mechanical media used as the selected physical data storage device.

80. The apparatus of claim 69, further comprising:
a failed physical data storage device which is removed from the computer data storage system, the failed physical data storage device having a first data stored thereon;
a new physical data storage device introduced into the computer data system to replace the failed physical data storage device;
a first VBN to DBN map created for the new physical data storage device, the first VBN to DBN map to store data originally stored on the failed physical data storage device on the new physical data storage device;
a second VBN to DBN map created for the new physical data storage device, the second VBN to DBN map to assign new VBN space to new DBN space provided by the new physical data storage device;
the processor to reconstruct the first data stored on the failed physical data storage device using the first VBN to DBN map;
the processor executing a process to cause the computer data storage device to flip from using the first map to using the second map to provide the new DBN space to the computer data storage system.

81. The apparatus as in claim 69, further comprising:
a new physical data storage device added to the computer data storage system;
a new VBN to DBN map for the new physical data storage device;
the processor to integrate the new VBN to DBN map into the computer data storage system to provide new storage capacity to the computer data storage system.

82. A computer readable storage media having program instructions for execution on a processor for a method of operating a computer data storage system, the method comprising:
assigning volume block numbers (VBNs) to a volume;
assigning data storage device block numbers (DBNs) to each of a plurality of physical data storage devices, the storage system including the physical data storage devices;
mapping the VBNs to the DBNs of the plurality of physical data storage devices by mapping parameters, the mapping parameters to map a range of VBN numbers to a selected range of DBNs on a selected physical data storage device of the plurality of physical data storage devices;
creating a plurality of VBN to DBN maps for the selected physical data storage device;
storing the plurality of VBN to DBN maps on the selected physical data storage device;
operating the data storage device using a first map of the plurality of VBN to DBN maps; and
causing the selected physical data storage device to flip from the first map to a second map of the plurality of VBN to DBN maps stored on the selected physical data storage device.

* * * * *